(12) United States Patent
Kim et al.

(10) Patent No.: US 12,499,034 B2
(45) Date of Patent: Dec. 16, 2025

(54) APPARATUS FOR TESTING AN INTERWORKING FUNCTION BETWEEN MULTIMEDIA DEVICES AND METHOD THEREOF

(71) Applicants: HYUNDAI MOTOR COMPANY, Seoul (KR); Kia Corporation, Seoul (KR)

(72) Inventors: Seong Un Kim, Anyang-si (KR); Seung Yeun Jang, Seoul (KR); Dae Youl Kim, Suwon-si (KR); Hyung Seok Lee, Seoul (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 160 days.

(21) Appl. No.: 18/127,809

(22) Filed: Mar. 29, 2023

(65) Prior Publication Data

US 2024/0134785 A1 Apr. 25, 2024
US 2024/0232063 A9 Jul. 11, 2024

(30) Foreign Application Priority Data

Oct. 19, 2022 (KR) .................... 10-2022-0135065

(51) Int. Cl.
  *G06F 11/3668* (2025.01)
  *G06F 11/3604* (2025.01)
  *G06F 40/279* (2020.01)

(52) U.S. Cl.
  CPC ...... *G06F 11/3692* (2013.01); *G06F 11/3612* (2013.01); *G06F 11/3688* (2013.01); *G06F 40/279* (2020.01)

(58) Field of Classification Search
  None
  See application file for complete search history.

(56) References Cited

U.S. PATENT DOCUMENTS

| | | | |
|---|---|---|---|
| 2008/0036971 A1* | 2/2008 | Hasegawa | G03B 21/26 345/1.3 |
| 2009/0106594 A1* | 4/2009 | Zhang | G06F 11/3476 714/37 |
| 2014/0068048 A1* | 3/2014 | Kind | H04L 41/0879 709/223 |
| 2014/0123111 A1* | 5/2014 | Lee | G06F 11/3688 717/124 |
| 2014/0237451 A1* | 8/2014 | Koneru | G06F 11/3692 717/124 |
| 2015/0211846 A1* | 7/2015 | Suzuki | G01C 15/00 702/150 |
| 2016/0077620 A1* | 3/2016 | Choi | G06F 3/041 345/173 |

(Continued)

*Primary Examiner* — Qing Chen
(74) *Attorney, Agent, or Firm* — MORGAN, LEWIS & BOCKIUS LLP

(57) ABSTRACT

An apparatus for testing a multimedia device includes a database log tracking device that transmits a log of a first terminal and a processor that monitors the log to detect a predetermined event, obtains event execution information at a timing when the event occurs from the first terminal and a second terminal interworking with the first terminal in response to that the event is detected, and compares the event execution information with predetermined reference information to determine operation states of the first and second terminals.

18 Claims, 10 Drawing Sheets

(56) References Cited

U.S. PATENT DOCUMENTS

| | | | |
|---|---|---|---|
| 2017/0083585 A1* | 3/2017 | Chen | G06F 11/3409 |
| 2017/0269910 A1* | 9/2017 | Mizota | G06K 17/0022 |
| 2018/0349429 A1* | 12/2018 | Ben-Rubi | G06F 11/3072 |
| 2022/0050765 A1* | 2/2022 | Pan | G06F 40/30 |
| 2023/0185900 A1* | 6/2023 | Kitamura | G06F 21/51 |
| | | | 726/22 |

* cited by examiner

| Index | Time | Time Stamp | ECU ID | APP ID | Payload |
|---|---|---|---|---|---|

FIG.8

APPARATUS FOR TESTING AN INTERWORKING FUNCTION BETWEEN MULTIMEDIA DEVICES AND METHOD THEREOF

CROSS-REFERENCE TO RELATED APPLICATION

This application claims the benefit of priority to Korean Patent Application No. 10-2022-0135065, filed in the Korean Intellectual Property Office on Oct. 19, 2022, the entire contents of which are incorporated herein by reference.

TECHNICAL FIELD

The present disclosure relates to an apparatus for testing a multimedia device and a method thereof, and more particularly, relates to technologies of evaluating functions of a plurality of multimedia devices and testing an interworking function between the multimedia devices.

BACKGROUND

Infotainment is a combination of information and entertainment, which refers to a device which provides information, audio, and visual entertainment. Recently, with the development of telematics, connected car, and autonomous vehicle technologies, in-vehicle infotainment (IVI) has gone beyond a simple multimedia device and has greatly increased in role and importance, such as notifying users of vehicle information or directly controlling the vehicle.

As the IVI has been developed, a user interface (UI), which takes charge of interaction between the vehicle and the user, has increased in complexity. Furthermore, as software is updated, a UI is continuously changed.

When software is updated, a test for evaluating operation performance proceeds. When the UI is changed, to evaluate performance, a condition for performing the components should be defined again as attributes of components making up a screen are changed.

Furthermore, in an existing method for testing a multimedia device, when two or more multimedia devices interwork with each other, it is difficult to easily identify an interworking state between the devices.

SUMMARY

The present disclosure has been made to solve the above-mentioned problems occurring in the related art while advantages achieved by the related art are maintained intact.

An aspect of the present disclosure provides an apparatus for testing a multimedia device to test operation performance of the multimedia device even without defining coordinates of a component making up a user interface again although the user interface is changed and a method thereof.

Another aspect of the present disclosure provides an apparatus for testing a multimedia device to more smoothly test interworking performance for two or more devices interworking with each other and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for testing a multimedia device may include a database log tracking device that transmits a log of a first terminal and a processor that monitors the log to detect a predetermined event, in response to the predetermined event being detected, obtains event execution information at a timing when the predetermined event occurs from the first terminal and a second terminal interworking with the first terminal, and compares the event execution information with predetermined reference information to determine operation states of the first and second terminals.

According to an embodiment, the processor may further detect a predetermined keyword from a payload of the log and may detect occurrence of the predetermined event at a timing when the predetermined keyword is detected.

According to an embodiment, the processor may further control the first terminal to perform route guidance and may receive the log from the first terminal in a period when the first terminal performs the route guidance.

According to an embodiment, the processor may further transmit virtual location information to the first terminal.

According to an embodiment, the processor may further extract the predetermined reference information stored previously, in response to the predetermined event.

According to an embodiment, the processor may further transmit a virtual user input to the first terminal at intervals of a certain time.

According to an embodiment, the processor may further identify a virtual input timing when the virtual user input is transmitted, the virtual input timing corresponding to the timing when the predetermined event occurs, and may extract the predetermined reference information corresponding to the virtual input timing.

According to an embodiment, the processor may further receive first image information including information of a screen displayed by the first terminal, and second image information including information of a screen displayed by the second terminal, at the timing when the predetermined event occurs.

According to an embodiment, the processor may further extract a partial image from the first image information and may extract a partial image from the second image information.

According to an embodiment, the processor may further receive state information in a naming-based data format from the first terminal.

According to another aspect of the present disclosure, a method for testing a multimedia device may include monitoring, by a processor, a log of a first terminal to detect a predetermined event, obtaining, by the processor, event execution information at a timing when the predetermined event occurs from the first terminal and a second terminal interworking with the first terminal, in response to that the predetermined event being detected, and comparing, by the processor, the event execution information with predetermined reference information to determine operation states of the first and second terminals.

According to an embodiment, the detecting of the predetermined event may include detecting, by the processor, a predetermined keyword from a payload of the log and detecting, by the processor, occurrence of the event at a timing when the predetermined keyword is detected.

According to an embodiment, the detecting of the predetermined event may include operating, by the processor, the first terminal to perform route guidance and receiving, by the processor, the log from the first terminal while the first terminal performs the route guidance.

According to an embodiment, the operating of the first terminal may include transmitting, by the processor, virtual location information to the first terminal.

According to an embodiment, the comparing of the event execution information with the predetermined reference information to determine the operation states of the first and second terminals may include extracting, by the processor, the predetermined reference information stored previously, in response to the event.

According to an embodiment, the operating of the first terminal may include transmitting, by the processor, a virtual user input to the first terminal at intervals of a certain time.

According to an embodiment, the comparing of the event execution information with the predetermined reference information to determine the operation states of the first and second terminals may include identifying, by the processor, a virtual input timing when the virtual user input is transmitted, the virtual input timing corresponding to the timing when the predetermined event occurs and extracting, by the processor, the predetermined reference information corresponding to the virtual input timing.

According to an embodiment, the obtaining of the event execution information from the first terminal and the second terminal may include receiving, by the processor, first image information including information of a screen displayed by the first terminal at the timing when the predetermined event occurs and receiving, by the processor, second image information including information of a screen displayed by the second terminal at the timing when the predetermined event occurs.

According to an embodiment, the obtaining of the event execution information from the first terminal and the second terminal may further include extracting, by the processor, a partial image from the first image information and extracting, by the processor, a partial image from the second image information.

According to an embodiment, the obtaining of the event execution information from the first terminal may include receiving, by the processor, state information in a naming-based data format from the first terminal.

BRIEF DESCRIPTION OF THE DRAWINGS

The above and other objects, features and advantages of the present disclosure will be more apparent from the following detailed description taken in conjunction with the accompanying drawings:

FIG. 8 is a schematic diagram illustrating an example of log data;

DETAILED DESCRIPTION

Figure 1:
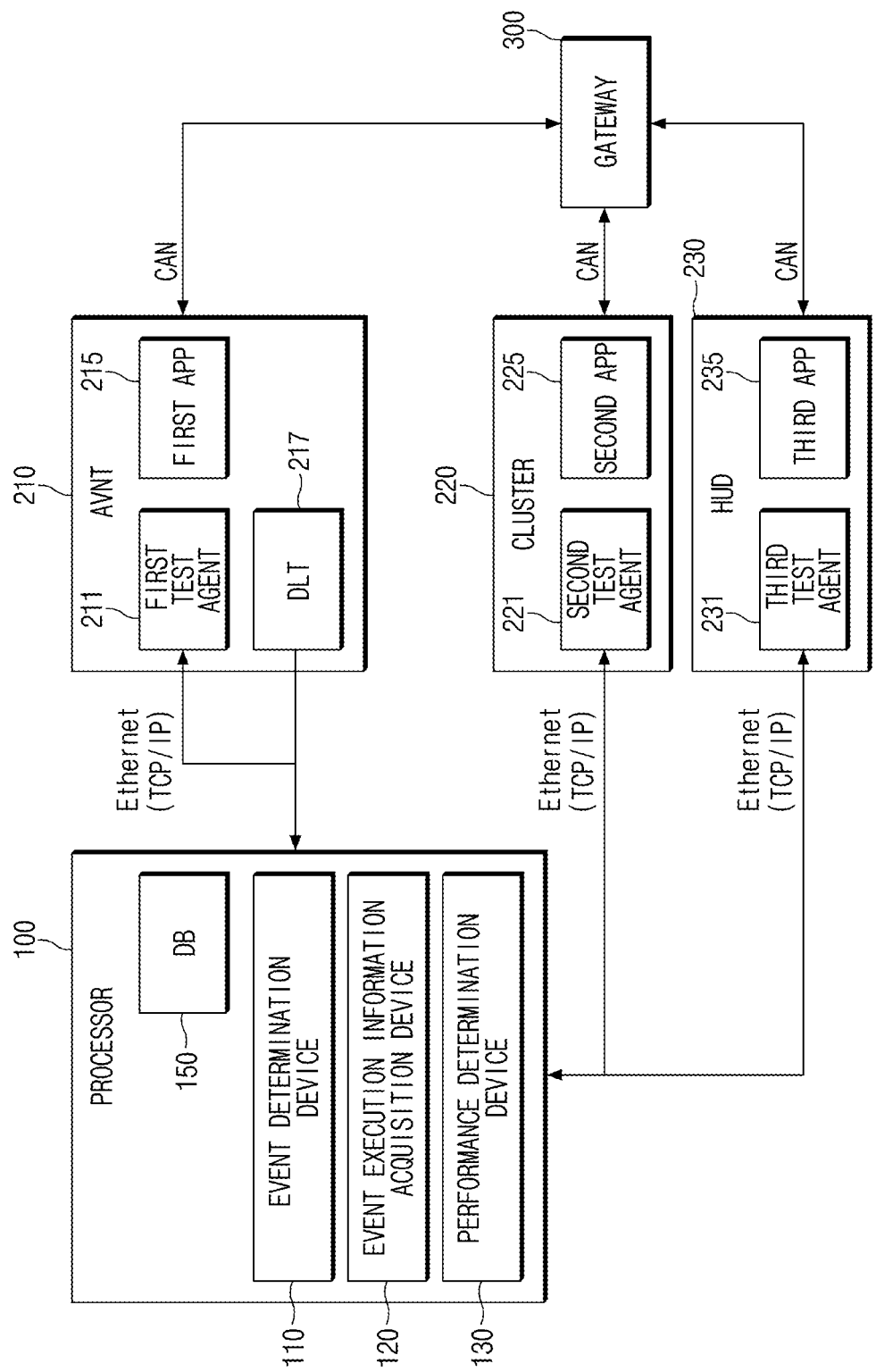
FIG. 1 is a drawing illustrating an apparatus for testing a function of a multimedia device according to an embodiment of the present disclosure.

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions may be omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 10.

FIG. 1 is a drawing illustrating an apparatus for testing a function of a multimedia device according to an embodiment of the present disclosure.

The apparatus for testing the function of the multimedia device may be an apparatus for evaluating a function of a user convenience device in a vehicle. Particularly, the apparatus for testing the function of the multimedia device may be to test an interworking function between two or more terminals interworking with each other.

The multimedia device may be an IVI system, which may be one of audio-video-navigation-telematics (AVNT) 210, a cluster 220, or a head-up-display (HUD) 230. The AVNT 210 may include navigation and may be referred to as navigation in a period when a route guidance function is performed.

Each of the AVNT 210, the cluster 220, and the HUD 230 may be one terminal. Hereinafter, in the specification, a description will be given of an embodiment in which the AVNT 210 is referred to as a first terminal, the cluster 220 is referred to as a second terminal, and the HUD 230 is referred to as a third terminal.

The AVNT 210 may include a test agent 211. The cluster 220 may include a second test agent 221. The HUD 230 may include a third test agent 231.

The first to third agents 211, 221, and 231 may generate component information about a screen, depending on a request of a processor 100.

The apparatus for testing the function of the multimedia device according to an embodiment may include the processor 100 and a database log tracking (DOLT) device 217.

The processor 100 may supervise to test operation performance of IVI devices and an interworking function between IVI devices and may report the test result.

To this end, the processor 100 may include an event determination device 110, an event execution information acquisition device 120, a performance determination device 130, and a database (DB) 150. The processor 100 and devices disclosed herein may include installed software and/or hardware that in operation causes or cause the processor and the devices to perform the actions described herein.

The event determination device 110 may monitor a log provided from the AVNT 210 to detect a predetermined event. In the present specification, an embodiment in which the AVNT 210 is the first terminal corresponding to a master terminal is described. However, in other embodiments, the first terminal may be the cluster 220 or the HUD 230.

The event determination device 110 may track a database log provided from the DLT device 217 of the AVNT 210 and may parse valid data in the database log. The valid data may be a predetermined keyword in a payload. The event determination device 110 may determine that an event occurs at a timing when the keyword is detected.

When the event is detected, the event execution information acquisition device 120 may request event execution information from terminals and may receive the event execution information from the terminal. In other words, the event execution information acquisition device 120 may request event execution information from the AVNT 210, the cluster 220, and the HUD 230 in response to the detection of the event. Furthermore, the event execution information acquisition device 120 may receive the event execution information from the AVNT 210, the cluster 220, and the HUD 230.

The execution information may include at least one of image information or state information.

The image information may be data of an image displayed on user interfaces (UIs) of terminals at a timing when the event occurs.

The state information may be information indicating operation states of terminals at the timing when the event occurs. For example, the state information may be information indicating whether a specific user input button is activated or information indicating whether an icon displaying a specific function is activated.

The performance determination device 130 may compare predetermined reference information with the execution information provided from the terminals to determine operation performance. The reference information may include reference image information for comparing image information and reference state information for comparing state information.

For example, when the state information provided from the cluster 220 is different from predetermined reference state information, the performance determination device 130 may determine that there is an operation error in the cluster 220 at the timing when the event occurs.

Alternatively, when the image information provided from the cluster 220 is different from predetermined reference image information, the performance determination device 130 may determine that there is an operation error in the cluster 220 at the time when the event occurs.

The performance determination device 130 may be performed based on artificial intelligence (AI) for image readout. To this end, the performance determination device 130 may include an AI processor. The AI processor may learn a neural network using a previously stored program. The neural network for image readout may include a plurality of network nodes having weights, which may be designed to simulate a human brain structure on the computer and may simulate neurons of the human neural network. The plurality of network nodes may transmit and receive data depending on each connection relationship to simulate the synaptic activity of neurons which transmit and receive signals through the synapse. The neural network may include a deep learning model developed from a neural network model. The plurality of network nodes in the deep learning model may be located on different layers to transmit and receive data depending on a convolution connection relationship. An example of the deep learning model may include various deep learning techniques such as deep neural networks (DNN), convolutional deep neural networks (CNN), a recurrent neural networks (RNN), a restricted Boltzmann machine (RBM), deep belief networks (DBN), and a deep Q-network.

The processor 100 may be loaded into the vehicle or may be installed in a server outside the vehicle. Alternatively, the processor 100 may be installed in a personal portable terminal such as a smartphone or a tablet PC.

The processor 100 and the IVI device may transmit and receive data through a communication module (not shown). The communication module may vary with the location where the processor 100 is installed. For example, when the processor 100 is located in the vehicle, the communication module may be implemented based on an Ethernet. Alternatively, when the processor 100 is located in a personal portable terminal, the communication module may be implemented based on short range communication. For example, when the processor 100 is located in an external server, the communication module may be implemented based on mobile communication.

Furthermore, the processor 100 may be coupled to another hardware to notify a user of the test result.

The DB 150 may store an AI processor, a test case, and component information.

The test case may be to virtually drive IVI devices, which may be a virtual driving scenario or a virtual input.

The virtual driving scenario may include predetermined virtual global positioning system (GPS) coordinate information to drive the IVI deice based on a virtual destination. In other words, IVI devices according to an embodiment of the present disclosure may operate a route guidance function based on GPS coordinates provided from the processor 100 at intervals of a certain time irrespective of the location of the vehicle.

The virtual input may be to virtually set manipulation of a user input means which controls an operation of the IVI device.

The DB 150 may be provided in the processor 100 or may be a separate memory. Thus, the DB 150 may be implemented as a hard disk drive, a flash memory, an electrically erasable programmable read-only memory (EEPROM), a static random access memory (SRAM), a ferro-electric RAM (FRAM), a phase-change RAM (PRAM), a magnetic RAM (MRAM), a dynamic RAM (DRAM), a synchronous DRAM (SDRAM), a double date rate-SDRAM (DDR-SDRAM), or the like.

Figure 2:
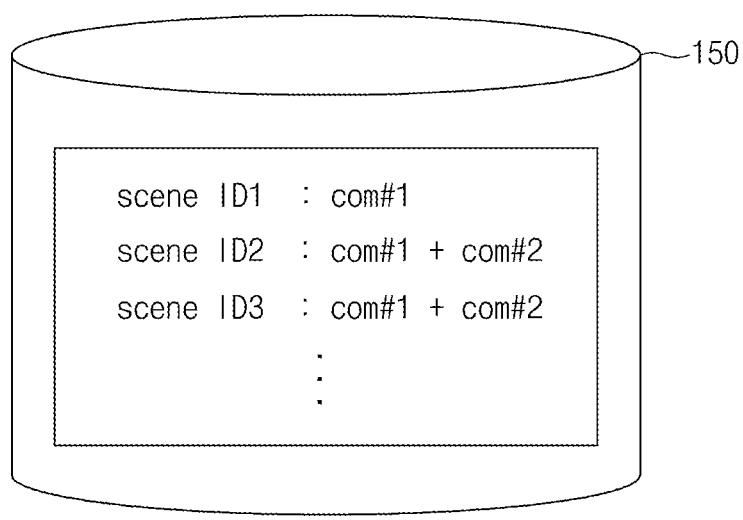
FIG. 2 is a drawing for describing a structure of screen and component information stored in a database (DB)
Figure 3:
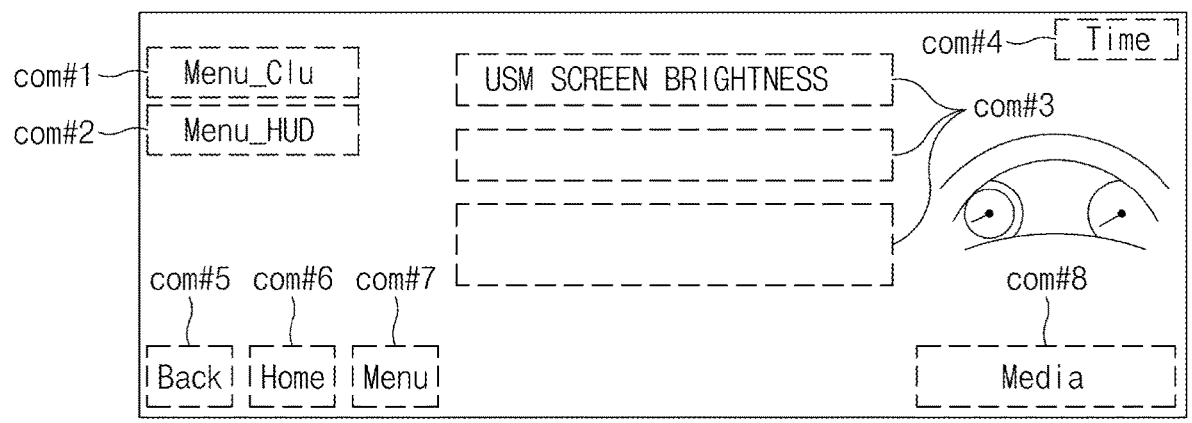
FIG. 3 is a drawing illustrating an example of a component.

FIG. 2 is a drawing for describing a structure of screen and component information stored in a DB. FIG. 3 is a drawing illustrating an example of a component.

Referring to FIGS. 2 and 3, a DB 150 may store pieces of data in a structure in which screen IDs and pieces of component information are matched with each other.

A screen may be divided with a screen ID. In other words, a screen displayed on a UI may be identified by a screen ID.

Components may be components making up the screen and may correspond to specific information or an icon of the screen. When the screen includes a UI, one user input device which manipulates any function may be specified as one component. For example, a first component com #1 may be a UI for setting a cluster menu, and a second component com #2 may be a UI for setting an HUD menu. A third component com #3 may be a UI for setting screen brightness, and a fourth component com #4 may be an icon for displaying time. A fifth component com #5 may be a UI for a back function, and a sixth component com #6 may be a UI corresponding to a home button. A seventh component com #7 may be a UI for a menu input, and an eighth component com #8 may be a UI for media activation.

Pieces of component information may include a name, coordinates, and state information for the component of the screen and may be implemented in a naming-based data format. For example, the component information may be formed as JSON.

Figure 4:
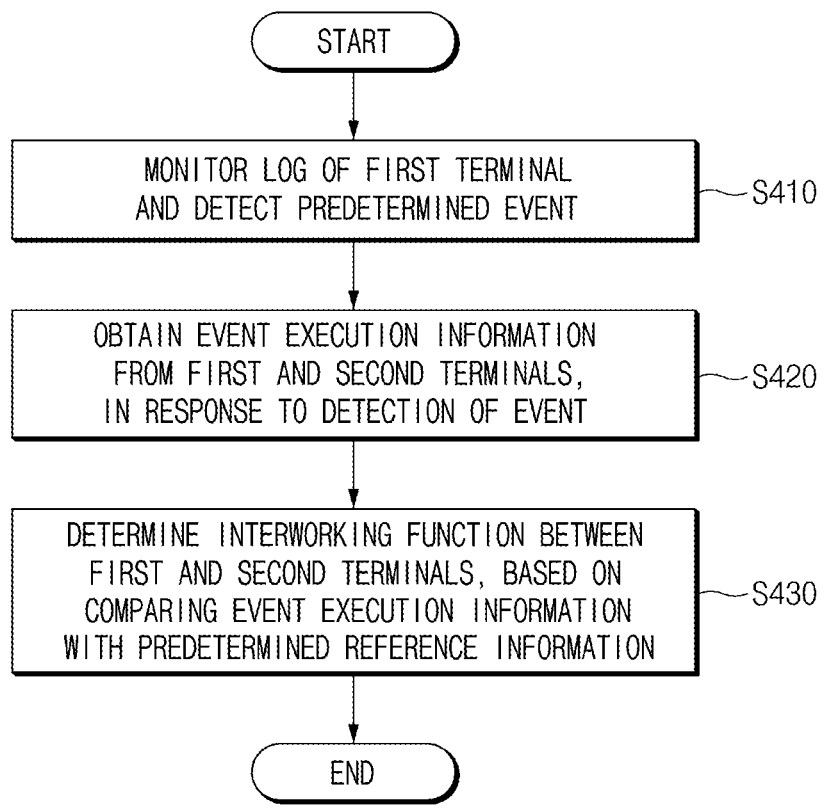
FIG. 4 is a flowchart illustrating a method for testing performance of a multimedia device according to another embodiment of the present disclosure.

FIG. 4 is a flowchart illustrating a method for testing performance of a multimedia device according to another embodiment of the present disclosure. Hereinafter, a description will be given in detail of the method for testing the performance of the multimedia device according to an embodiment of the present disclosure with reference to FIG. 4.

In S410, a processor 100 of FIG. 1 may monitor a log of a first terminal 210 to detect a predetermined event. The first terminal 210 may be AVNT 210 of FIG. 1.

The process where the processor 100 monitors the log may be performed while the operation of the AVNT 210 is in progress.

According to an embodiment, the processor 100 may monitor a log of the AVNT 210 which operates while the vehicle is traveling.

Alternatively, the processor 100 may monitor the log of the AVNT 210 which operates based on virtual driving. For virtual driving, the processor 100 may use a predetermined test case. The processor 100 may provide the AVNT 210 with virtual location coordinates of the test case at intervals of a certain time to operate the AVNT 210. The virtual location coordinates may be virtual GPS information (virtual location information).

FIGS. 5 to 8 are drawings explaining the S410.

Figure 5:
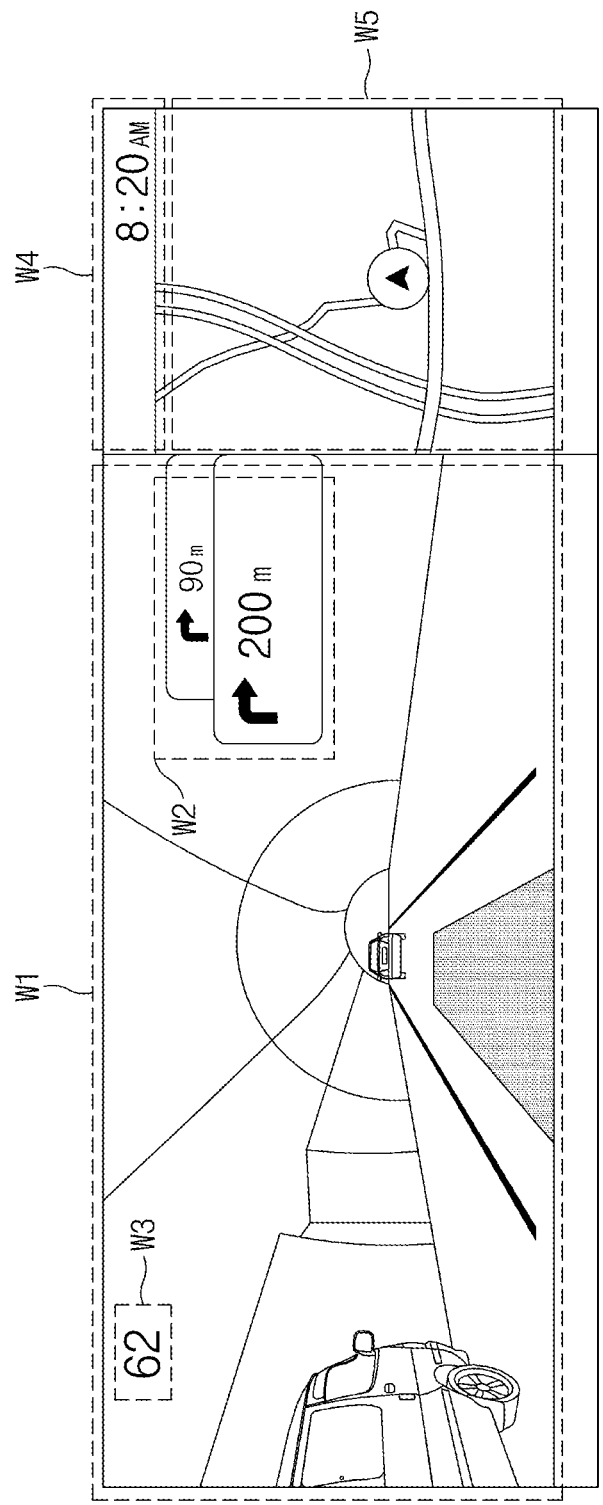
FIGS. 5, 6, and 7 are drawings illustrating examples of operation states of other terminals which interwork with each other according to an operation of AUNT.
Figure 6:
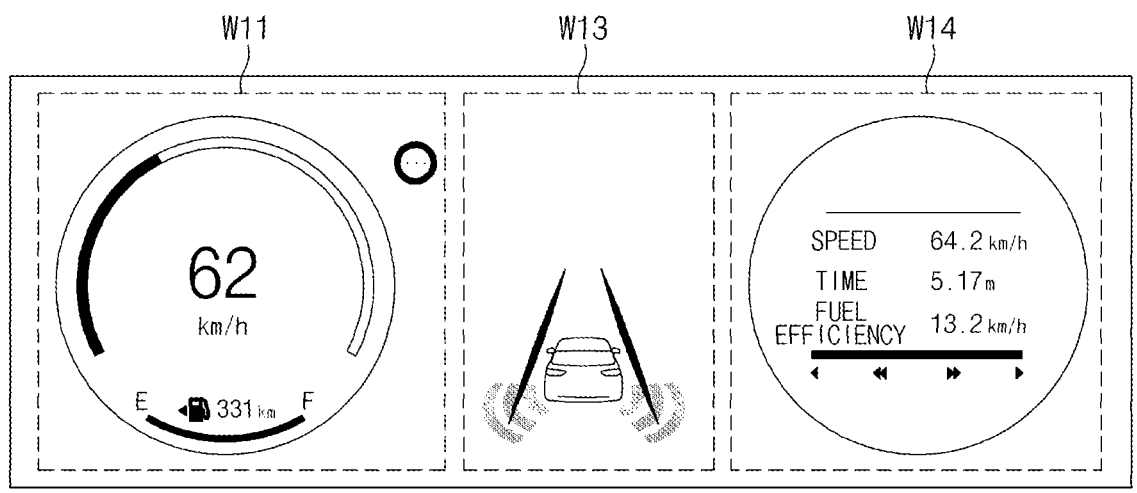
Figure 7:
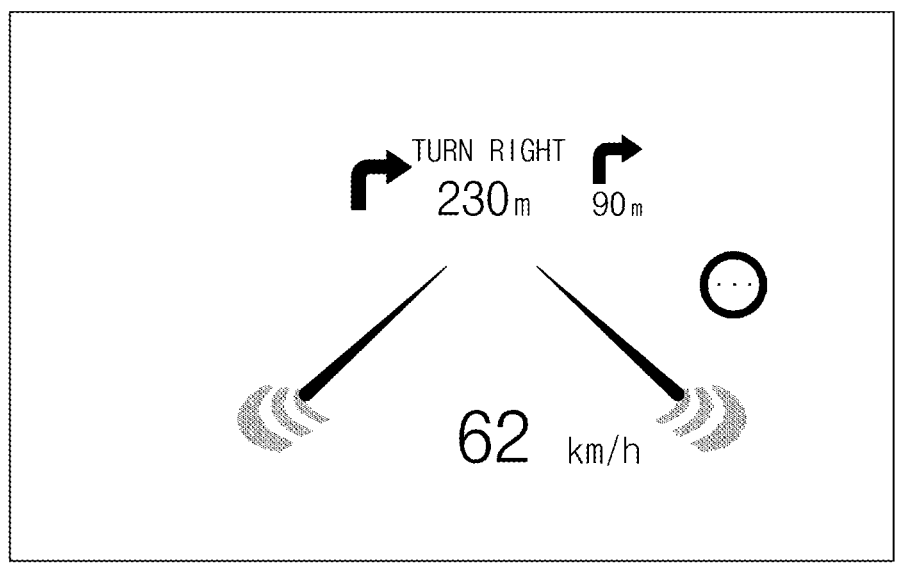

FIGS. 5 to 7 are drawings illustrating examples of operation states of other terminals which interwork with each other according to an operation of AVNT. FIG. 5 is a drawing illustrating an operation state of AVNT. FIG. 6 is a drawing illustrating an operation state of a cluster. FIG. 7 illustrates an operation state of an HUD.

Referring to FIGS. 5 to 7, terminals of an IVI device may display a driving state and road guidance information of a vehicle in response to an operation of navigation.

As shown in FIG. 5, AVNT 210 of FIG. 1 may display first to fifth windows W1 to W5 depending on an operation of the navigation. The first window W1 may be a region which displays the road. The second window W2 may be a region which displays route guidance. The third window W3 may be a region which displays a driving speed. The fourth window W4 may be a region which displays a current time or a time to reach destination. The fifth window W5 may be a region which displays a map.

As shown in FIG. 6, according to an operation of the navigation, a cluster 220 in digital form may display an 11th window W11, a 13th window W13, and a 14th window W14. The 11th window W11 may be a window which displays a vehicle speed and remaining fuel. The 13th window W13 may be a window which displays an interval between the vehicle and lines. The 14th window W14 may be a window which displays a vehicle speed, a time to a destination, and fuel efficiency.

As shown in FIG. 7, according to the operation of the navigation, an HUD 230 of FIG. 1 may display route guidance information. For example, the HUD 230 may display an interval between the vehicle and the lines and may display route guidance.

As such, while terminals interworking with each other in an IVI are operating, a processor 100 of FIG. 1 may monitor log data transmitted from the AVNT 210.

Figure 8:
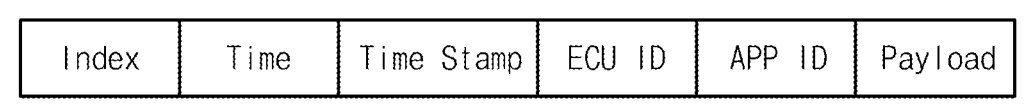

FIG. 8 is a schematic diagram illustrating an example of log data.

Referring to FIG. 8, log data transmitted by AVNT 210 of FIG. 1 may include index information, time information, time stamp information, an ECU ID, an APP ID, and a payload. The format of the log data may not be limited thereto.

A processor 100 of FIG. 1 may extract a predetermined keyword from the payload to detect an event in the payload. The keyword may be a keyword which belongs to data having a trigger function. For example, the keyword may be data associated with guidance on a direction change, such as "turn left" or "turn right". Furthermore, the keyword may be data associated with guidance on a speed bump. Furthermore, the keyword may be data associated with guidance on a speed camera.

As such, when the predetermined keyword is detected from the log data, the processor 100 may detect that the event occurs.

In S420 in FIG. 4, the processor 100 may obtain event execution information in response to that the event is detected.

The event execution information may include first event execution information provided from a first terminal and second event execution information provided from a second terminal. The first terminal may be AUNT 210 of FIG. 1, and the second terminal may be a cluster 220 of FIG. 1.

The execution information may include one of image information or state information.

In S430 in FIG. 4, the processor 100 may compare the execution information with reference information to determine an interworking function between the first terminal 210 and the second terminal 220.

The reference information may include reference image information for determining the image information and reference state information for determining the state information.

A description will be given below of a detailed method for determining an interworking function in the processor 100.

Figure 9:
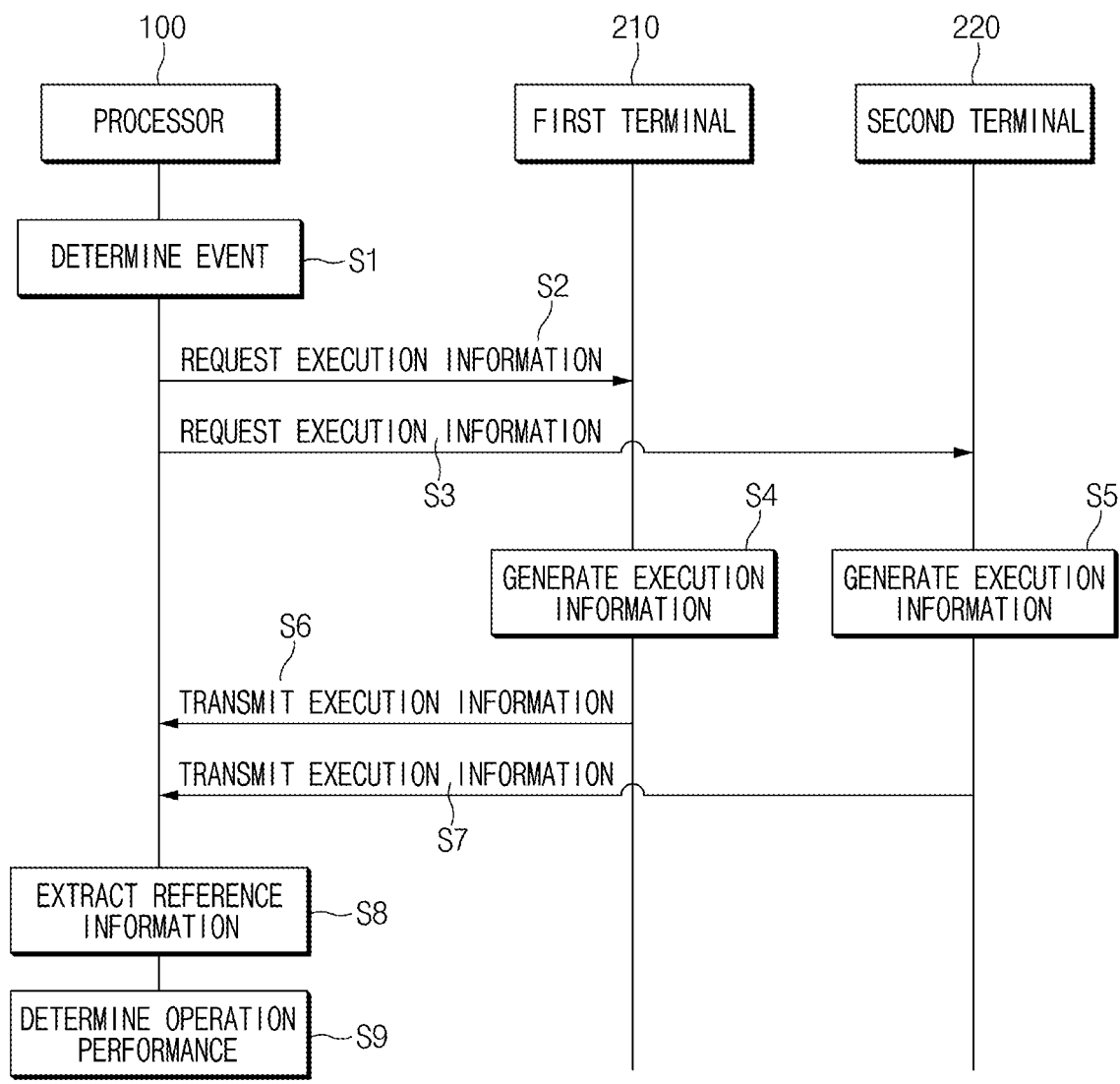
FIG. 9 is a signal sequence diagram illustrating a method for testing a multimedia device according to another embodiment of the present disclosure.

FIG. 9 is a signal sequence diagram illustrating a method for testing a multimedia device according to another embodiment of the present disclosure. The method for testing the multimedia device according to another embodiment of the present disclosure will be described with reference to FIG. 9. A first terminal 210 shown in FIG. 9 may be AVNT 210, a cluster 220, or an HUD 230 of an IVI device. Furthermore, a second terminal 220 may be a terminal other than the first terminal 210 among the AVNT 210, the cluster 220, or the HUD 230 of the IVI device.

In S1, a processor 100 may determine an event. S1 may use S410 shown in FIG. 4. in other words, the processor 100 may detect occurrence of an event based on detecting a predetermined keyword from log data.

In S2, the processor 100 may request execution information from the first terminal 210, based on the detection of the event.

To this end, when detecting the event, the processor 100 may identify information about a time of log data when a keyword is detected from log data to determine a timing when the event occurs. The processor 100 may request execution information at the timing when the event occurs from the first terminal 210.

Furthermore, in S3, the processor 100 may request execution information from the second terminal 220. The processor 100 may request the execution information at the timing when the event occurs from the second terminal 220.

In S4, the first terminal 210 may generate the execution information.

The first terminal 210 may generate the execution information at the timing when the event occurs, in response to the request of the processor 100.

The first terminal 210 may generate the execution information at regular time intervals and may extract execution information at a timing when the event occurs, in response to the request for the execution information from the processor 100.

The first terminal 210 may generate first execution information including any one of state information and image information.

The first terminal 210 may generate state information in a JSON data format. The state information may be information indicating an operation state of a component or an icon display state of the component. For example, when a screen displaying a tollgate is displayed on a UI of the first terminal 210, the first terminal 210 may extract state information, "Tollgate==on". Similarly, when the UI of the first terminal 210 displays traffic information of a speed camera, a speed bump, traffic lights, or the like, the first terminal 210 may extract text-based state information corresponding to the displaying of the UI.

The first terminal 210 may obtain a screen, which is displayed on a UI at the timing when the event occurs, as image information. In other words, the first terminal 210 may obtain a capture image at timing when the event occurs as image information.

The image information may be a full screen displayed on the UI or may be a partial image in which only an image of a specific region is extracted.

The first terminal 210 may obtain an image associated with a main function in the full screen as a partial image. When the first terminal 210 is AUNT, it may obtain a main image associated with route guidance as a partial image. The partial image may be obtained by extracting a partial region from one frame. For example, the first terminal 210 may obtain a route guidance indication displayed by an arrow, a speed, a speed bump, a speed camera, or the like as a partial image. To this end, the first terminal 210 may extract objects from the full screen at the timing when the event occurs and may perform AI learning of the extracted objects to obtain a partial image corresponding to the main image.

Alternatively, the first terminal 210 may extract an image of a predetermined region in response to the event. According to the event, a region where the first terminal 210 displays an image may be preset. Thus, the first terminal 210 may extract a specific region of a UI as a first reference image in response to the event.

According to an embodiment, the procedure of obtaining the image associated with the main function in the full screen as the partial image may be performed by the processor 100.

In S5, the second terminal 220 may generate second execution information including any one of state information and image information.

The second terminal 220 may generate state information in a JSON data format. The method where the second terminal 220 obtains the state information may be the same as S4.

The second terminal 220 may obtain a screen, which is displayed on a UI at the timing when the event occurs, as image information. The method where the second terminal 220 obtains the image information may be the same as S5.

In S6, the first terminal 210 may transmit the execution information to the processor 100. The first terminal 210 may transmit at least one of the state information or the image information to the processor 100.

In S7, the second terminal 220 may transmit the execution information to the processor 100. The second terminal 220 may transmit at least one of the state information or the image information to the processor 100.

In S8, the processor 100 may extract reference information.

The reference information may include reference state information for determining the state information and may be reference image information for determining the image information.

A DB 150 of the processor 100 may store the reference information in advance. The DB 150 may separately store first reference information for comparison with first execution information provided from the first terminal 210 and second reference information for comparison with second execution information provided from the second terminal 220.

The DB 150 may classify and store the reference information based on the event. For example, the first terminal 210 and the second terminal 220 may display a specific icon or specific information on the UI in response to the event. When the event is to provide a notification that it is scheduled to enter a tollgate, the first terminal 210 may display an image displaying a tollgate image or a tollgate entry route on the UI.

Thus, in response to the event providing the notification that it is scheduled to enter the tollgate, the DB 150 may set and store information corresponding to "Tollgate==on" to first reference state information.

Alternatively, the DB 150 may store a tollgate image as first reference image information, in response to the event providing the notification that it is scheduled to enter the tollgate.

The processor 100 may extract reference information based on the event. When the first execution information provided from the first terminal 210 is generated in response to the event providing the notification that it is scheduled to enter the tollgate, the processor 100 may extract first reference information corresponding to the event providing the notification that it is scheduled to enter the tollgate.

Likewise, the processor 100 may extract second reference information.

In S9, the processor 100 may determine operation performance.

The processor 100 may compare the first reference information with the first execution information to determine an operation state of the first terminal 210.

The processor 100 may compare the first reference image information with first image information. Because the main purpose of S9 is to determine whether an operation is performed, the processor 100 may determine whether there is an image corresponding to the first reference image information in the first image information. For example, when the first reference image information is a tollgate image, the processor 100 may determine whether there is the tollgate image in the first image information.

When there is an image corresponding to the first reference image information in the first image information, the processor 100 may determine that the first terminal 210 performs a normal operation in the event.

When there is no image corresponding to the first reference image information in the first image information, the processor 100 may determine that the first terminal 210 performs an error operation in the event.

The processor 100 may compare first reference state information with first state information. For example, when extracting information corresponding to "Tollgate==on" as the first reference state information in response to the event providing the notification that it is scheduled to enter the tollgate, the processor 100 may determine whether there is the information corresponding to "Tollgate==on" in the first state information.

When there is information corresponding to the first reference state information in the first state information, the processor 100 may determine that the first terminal 210 performs the normal operation in the event.

When there is no information corresponding to the first reference state information in the first state information, the processor 100 may determine that the first terminal 210 performs an error operation in the event.

Similarly, the processor 100 may compare second reference information with second execution information to determine an operation state of the second terminal 220. In other words, the processor 100 may compare second reference image information with second image information. Furthermore, the processor 100 may compare second reference state information with second state information.

Based on it, the processor 100 may determine an operation state of the second terminal 220 at the timing when the event occurs.

Furthermore, the processor 100 may write a report on the result of determining operation states of the first terminal 210 and the second terminal 220.

The embodiment described above describes the test case generated based on the virtual driving scenario.

The embodiment of the test case is not limited thereto. For example, the test case may include a virtual input for directly controlling operations of the first terminal 210 and the second terminal 220 at intervals of a certain time.

When the test case is the virtual input for controlling the operations of the first terminal 210 and the second terminal 220, the DB 150 may store reference information corresponding to the virtual input at intervals of a certain time. In other words, the processor 100 may identify a virtual input timing at which a user input corresponding to the timing when the event occurs is transmitted and may extract reference information corresponding to the virtual input timing.

Furthermore, FIG. 9 illustrates the embodiment of determining the operations of the first terminal 210 and the second terminal 220 interworking with each other. However, the processor 100 may determine an interworking state between first to third terminals interworking with each other. To this end, the processor 100 may request execution information from the third terminal in response to the event and may receive the execution information from the third terminal. The processor 100 may determine an operation state of the third terminal based on the execution information from the third terminal.

Figure 10:
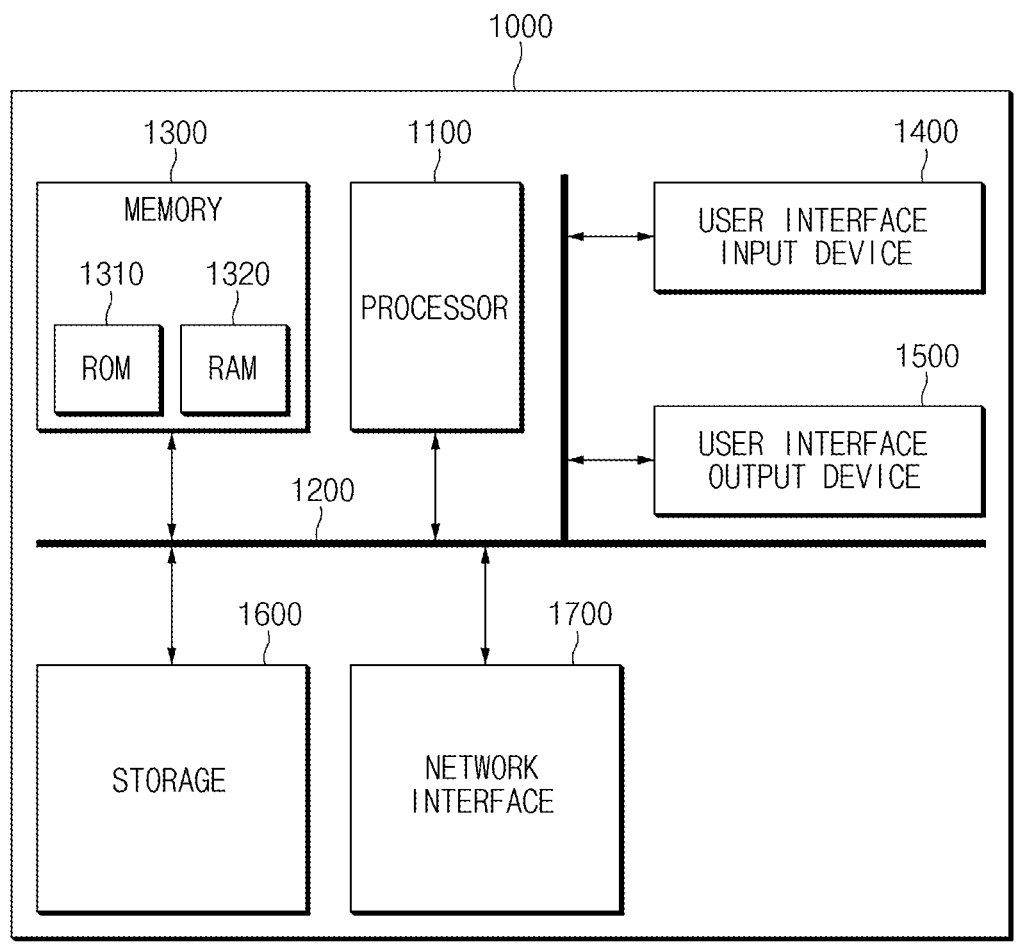
FIG. 10 is a block diagram illustrating a computing system according to an embodiment of the present disclosure.

FIG. 10 illustrates a computing system according to an embodiment of the present disclosure. FIG. 10 illustrates an embodiment in which the processor shown in FIG. 1 is loaded into a computing system in a vehicle.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

According to an embodiment of the present disclosure, as the process of obtaining component information to test an operation of a multimedia device is performed based on naming, such as a name, rather than based on coordinates, although coordinates vary as the user interface is changed, it may smoothly proceed with testing the operation of the multimedia device.

Furthermore, as operation states of terminals interworking with each other are able to be determined based on execution information of the terminals at a timing when an event occurs, operation states of the terminals interworking with each other in an interworking function may be determined as well as separate operation states of the terminals interworking with each other.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for testing a multimedia device, the apparatus comprising:
  a memory storing program instructions; and
  a processor configured to execute the program instructions, the program instructions, when executed, configured to:
    receive a log of a first terminal,
    when a keyword is detected among predetermined keywords in the log of the first terminal, detect a predetermined event matching the detected keyword, wherein the predetermined keywords are each associated with a predetermined function of the first terminal and a predetermined function of a second terminal,
    execute the predetermined function of the first terminal at an event timing to obtain a first event execution information indicating an operation state of the first terminal,
    execute the predetermined function of the second terminal at the event timing to obtain a second event execution information indicating an operation state of the second terminal, wherein the second terminal interworks with the first terminal at the event timing,
    compare the first event execution information with a first reference information matching the predetermined event among a plurality of predetermined reference information to determine whether the operation state of the first terminal is abnormal,
    compare the second event execution information with a second reference information matching the predetermined event among the plurality of predetermined reference information to determine whether the operation state of the second terminal is abnormal, and
    report on a result of determining whether the operation states of the first terminal and the second terminal are abnormal,
    wherein the event timing is a timing when the predetermined event occurs from the first terminal and the second terminal.

2. The apparatus of claim 1, wherein the processor is further configured to execute the program instructions configured to:
  detect the keyword from a payload of the log of the first terminal, and
  determine a timing when the keyword is detected as the event timing.

3. The apparatus of claim 1, wherein the processor is further configured to execute the program instructions configured to:
  operate the first terminal to perform route guidance, and
  receive the log of the first terminal from the first terminal while the first terminal performs the route guidance.

4. The apparatus of claim 3, wherein the processor is further configured to execute the program instructions configured to transmit virtual location information to the first terminal.

5. The apparatus of claim 3, wherein the processor is further configured to execute the program instructions configured to transmit a virtual user input to the first terminal at intervals of a certain time.

6. The apparatus of claim 5, wherein the processor is further configured to execute the program instructions configured to:
  identify a virtual input timing when the virtual user input is transmitted, wherein the virtual input timing corresponds to the event timing when the predetermined event occurs from the first terminal, and
  extract the first reference information corresponding to the virtual input timing.

7. The apparatus of claim 1, wherein the processor is further configured to execute the program instructions configured to:
  receive first image information including information of a screen displayed by the first terminal at the event timing when the predetermined event occurs from the first terminal, and
  receive second image information including information of a screen displayed by the second terminal at the event timing when the predetermined event occurs from the second terminal.

8. The apparatus of claim 7, wherein the processor is further configured to execute the program instructions configured to:
  extract a partial image from the first image information, and
  extract a partial image from the second image information.

9. The apparatus of claim 1, wherein the processor is further configured to execute the program instructions configured to receive state information in a naming-based data format from the first terminal.

10. A method for testing a multimedia device, the method comprising:
  receiving, by a processor, a log of a first terminal;
  when a keyword is detected among predetermined keywords in the log of the first terminal, detecting, by the processor, a predetermined event matching the detected keyword, wherein the predetermined keywords are each associated with a predetermined function of the first terminal and a predetermined function of a second terminal;
  executing, by the processor, the predetermined function of the first terminal at an event timing to obtain a first event execution information indicating an operation state of the first terminal;
  executing, by the processor, the predetermined function of the second terminal at the event timing to obtain a second event execution information indicating an operation state of the second terminal, wherein the second terminal interworks with the first terminal at the event timing;
  comparing, by the processor, the first event execution information with a first reference information matching the predetermined event among a plurality of predetermined reference information to determine whether the operation state of the first terminal is abnormal;
  comparing, by the processor, the second event execution information with a second reference information matching the predetermined event among the plurality of predetermined reference information to determine whether the operation state of the second terminal is abnormal; and
  reporting, by the processor, on a result of determining whether the operation states of the first terminal and the second terminal are abnormal,
  wherein the event timing is a timing when the predetermined event occurs from the first terminal and the second terminal.

11. The method of claim 10, wherein the detecting of the predetermined event matching the detected keyword includes:
- detecting, by the processor, the keyword from a payload of the log of the first terminal; and
- determining, by the processor, a timing when the keyword is detected as the event timing.

12. The method of claim 10, wherein the detecting of the predetermined event matching the detected keyword includes:
- operating, by the processor, the first terminal to perform route guidance; and
- receiving, by the processor, the log of the first terminal from the first terminal while the first terminal performs the route guidance.

13. The method of claim 12, wherein the operating of the first terminal to perform the route guidance includes:
- transmitting, by the processor, virtual location information to the first terminal.

14. The method of claim 12, wherein the operating of the first terminal to perform the route guidance includes:
- transmitting, by the processor, a virtual user input to the first terminal at intervals of a certain time.

15. The method of claim 14, wherein the comparing of the first event execution information with the first reference information matching the predetermined event among the plurality of predetermined reference information to determine whether the operation state of the first terminal is abnormal includes:
- identifying, by the processor, a virtual input timing when the virtual user input is transmitted, wherein the virtual input timing corresponds to the event timing when the predetermined event occurs from the first terminal; and
- extracting, by the processor, the first reference information corresponding to the virtual input timing.

16. The method of claim 10,
wherein the obtaining of the first event execution information indicating the operation state of the first terminal includes:
receiving, by the processor, first image information including information of a screen displayed by the first terminal at the event timing when the predetermined event occurs from the first terminal, and
wherein the obtaining of the second event execution information indicating the operation state of the second terminal includes:
receiving, by the processor, second image information including information of a screen displayed by the second terminal at the event timing when the predetermined event occurs from the second terminal.

17. The method of claim 16,
wherein the obtaining of the first event execution information indicating the operation state of the first terminal at the event timing includes:
extracting, by the processor, a partial image from the first image information, and
wherein the obtaining of the second event execution information indicating the operation state of the second terminal includes:
extracting, by the processor, a partial image from the second image information.

18. The method of claim 10, wherein the obtaining of the first event execution information indicating the operation state of the first terminal at the event timing includes:
receiving, by the processor, state information in a naming-based data format from the first terminal.

* * * * *